(12) United States Patent
Lindahl et al.

(10) Patent No.: US 8,380,959 B2
(45) Date of Patent: Feb. 19, 2013

(54) MEMORY MANAGEMENT SYSTEM AND METHOD

(75) Inventors: Aram Lindahl, Menlo Park, CA (US);
Jesse W. Boettcher, San Jose, CA (US);
David J. Rempel, San Jose, CA (US);
Pulkit Desai, Santa Clara, CA (US);
Vincent Wong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1012 days.

(21) Appl. No.: 12/205,702

(22) Filed: Sep. 5, 2008

(65) Prior Publication Data
US 2010/0064113 A1    Mar. 11, 2010

(51) Int. Cl.
*G06F 13/00* (2006.01)
*G06F 13/28* (2006.01)

(52) U.S. Cl. .. 711/170; 711/173; 711/158; 711/E12.002

(58) Field of Classification Search ............ None
See application file for complete search history.

(56) References Cited

U.S. PATENT DOCUMENTS

| | | | |
|---|---|---|---|
| 6,606,388 B1 | 8/2003 | Townsend et al. | |
| 2004/0186976 A1* | 9/2004 | Bayt | 711/170 |
| 2004/0257432 A1 | 12/2004 | Girish et al. | |
| 2005/0201572 A1 | 9/2005 | Lindahl et al. | |
| 2006/0067535 A1 | 3/2006 | Culbert et al. | |
| 2006/0067536 A1 | 3/2006 | Culbert et al. | |
| 2006/0088228 A1 | 4/2006 | Marriott et al. | |
| 2006/0100978 A1 | 5/2006 | Heller et al. | |
| 2006/0153040 A1 | 7/2006 | Girish et al. | |
| 2006/0221788 A1 | 10/2006 | Lindahl et al. | |
| 2006/0258289 A1* | 11/2006 | Dua | 455/41.3 |
| 2006/0265637 A1 | 11/2006 | Marriott et al. | |
| 2006/0274905 A1 | 12/2006 | Lindahl et al. | |
| 2007/0083467 A1 | 4/2007 | Lindahl et al. | |
| 2007/0157268 A1 | 7/2007 | Girish et al. | |
| 2007/0217716 A1 | 9/2007 | Marriott et al. | |
| 2007/0271312 A1 | 11/2007 | Heller et al. | |
| 2008/0065987 A1 | 3/2008 | Boettcher et al. | |
| 2008/0075296 A1 | 3/2008 | Lindahl et al. | |
| 2008/0125890 A1 | 5/2008 | Boettcher | |
| 2009/0132770 A1* | 5/2009 | Lin | 711/154 |

OTHER PUBLICATIONS

Boettcher, Jesse W. et al., U.S. Appl. No. 11/899,024, filed Sep. 4, 2007.
Lee, Jeffery et al., U.S. Appl. No. 11/899,145, filed Sep. 4, 2007.
Huang, Steven et al., U.S. Appl. No. 11/899,026, filed Sep. 4, 2007.
Lee, Jeffery et al., U.S. Appl. No. 11/899,027, filed Sep. 4, 2007.
Huang, Steven et al., U.S. Appl. No. 11/899,025, filed Sep. 4, 2007.
Huang, Steven et al., U.S. Appl. No. 11/899,034, filed Sep. 4, 2007.
Wakrat, Nir et al., U.S. Appl. No. 12/050,757, filed Mar. 18, 2008.

* cited by examiner

*Primary Examiner* — Kevin Verbrugge
*Assistant Examiner* — Eric S Cardwell
(74) *Attorney, Agent, or Firm* — Fish & Richardson P.C.

(57) ABSTRACT

A technique for managing memory allocation in an electronic device is provided. In one embodiment, a method includes loading a memory allocation strategy for an application executed by a processor of a device, and requesting memory for the application from various memory locations in accordance with the memory allocation strategy. In one embodiment, the device includes multiple sets of contiguous memory blocks and a memory heap, memory may be requested from at least one of these memory locations, and memory may then be allocated to the application in response to the request. In some embodiments, the memory allocation strategy may be stored in the device prior to execution of the application. Various other methods, devices, and manufactures are also provided.

28 Claims, 6 Drawing Sheets

MEMORY MANAGEMENT SYSTEM AND METHOD

BACKGROUND

1. Technical Field

The present invention relates generally to electronic devices and, more particularly, to the management of memory allocation to programs in such devices.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic devices, such as computers, portable media players, and mobile phones, often include executable software applications that provide various functionalities. Such applications are typically stored in a storage device, such as a hard drive or a flash memory, and executed by a processor at a given time (e.g., device start-up), on an as-needed basis, or when desired by the user (e.g., in response to a user input). To increase the speed with which applications may be executed, memory resources (such as from a random access memory) are often allocated to the application, and application instructions may be loaded into the allocated memory for execution by the processor.

Over time, electronic devices have generally increased in both hardware and software complexity, providing more and more functions to a user at seemingly ever increasing speeds. Additionally, the size of many such devices has decreased—the processing power of a modern handheld computing device can easily exceed that of much larger devices a generation ago. This decrease in size, however, results in a premium on space within the device for components such as additional memory. Also, the inclusion of additional memory typically increases the cost of the device. As may be appreciated from these trends, in some instances numerous applications of an electronic device may place significant demands on the memory system of the device. If an application cannot access sufficient memory, or cannot access such memory in an efficient manner, the application may not operate in a desired manner and may cease working at all. Such failures may negatively impact overall performance, as well as the experience of a user in operating the device.

SUMMARY

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

The present disclosure relates to techniques for managing memory allocation to clients, such as applications, in an electronic device or system. In accordance with one disclosed embodiment, an electronic device may include a number of stored applications executable by a processor, and memory that may be allocated to the executed applications. In one embodiment, the memory is logically organized into three or more groups, such as a group of large blocks of contiguous memory, a group of medium blocks of contiguous memory, and a memory heap.

Memory allocation strategies associated with the applications may be used to control the order in which memory is requested from the various memory groups. For instance, depending on the memory space needs of the applications, certain types of applications (e.g., those that may require or benefit from contiguous memory in sizes larger than a medium block and cannot be reliably provided from the memory heap) may first request memory from the large blocks in accordance with their associated memory allocation strategies, while other applications may first request memory from the medium blocks or from the memory heap in accordance with their respective memory allocation strategies. In one embodiment, providing medium blocks smaller in size than the largest memory requests from certain applications (which may be fulfilled by the large blocks) may facilitate memory allocation to other applications, such as those that may benefit from some amount of contiguous memory, but do not require or substantially benefit from the additional memory available in a large block. In some embodiments, such an arrangement may reduce the frequency with which large blocks are partitioned to meet memory requests from multiple applications or clients requiring less memory than that available in a large block, while still allowing large blocks of memory to be allocated to clients on an as-needed basis. The memory allocation strategies may also include secondary preferences for memory sources, from which memory may be requested if memory from the first requested group is unavailable. Additionally, in some embodiments, the presently disclosed techniques may be applied to allocating graphics memory to various clients.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment.

Figure 1:
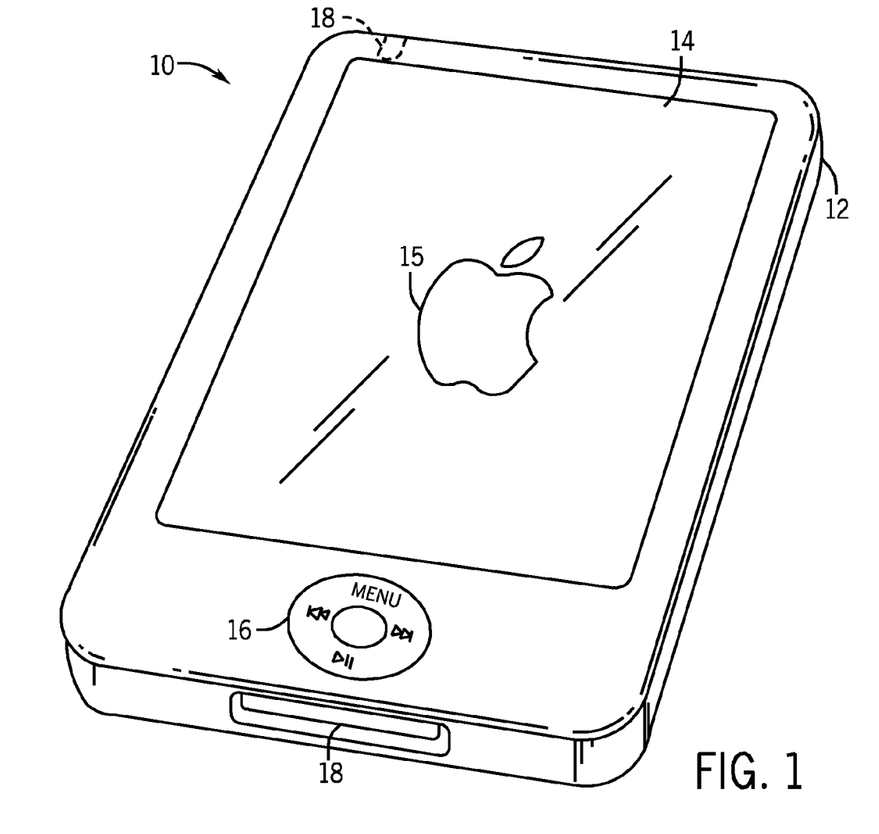
FIG. 1 is a perspective view illustrating a portable media player in accordance with one embodiment of the present invention.

Turning now to the drawings, and referring first to FIG. 1, an exemplary electronic device 10 is depicted in accordance with one embodiment of the present invention. In some embodiments, including the presently illustrated embodiment, the device 10 may be a portable electronic device, such as a media player, a cellular phone, a personal data organizer, or the like. Indeed, in such embodiments, a portable electronic device may include a combination of the functionalities of such devices. In addition, the electronic device 10 may allow a user to connect to and communicate through the Internet or through other networks, such as local or wide area networks. For example, the portable electronic device 10 may allow a user to access the internet and to communicate using e-mail, text messaging, instant messaging, or using other forms of electronic communication. By way of example, the electronic device 10 may be a model of an iPod® having a display screen or an iPhone® available from Apple Inc.

In certain embodiments, the device 10 may be powered by one or more rechargeable and/or replaceable batteries. Such embodiments may be highly portable, allowing a user to carry the electronic device 10 while traveling, working, exercising, and so forth. In this manner, and depending on the functionalities provided by the electronic device 10, a user may listen to music, play games or video, record video or take pictures, place and receive telephone calls, communicate with others, control other devices (e.g., via remote control and/or Bluetooth functionality), and so forth while moving freely with the device 10. In addition, device 10 may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to allocate memory to executed programs, such as a desktop computer.

In the presently illustrated embodiment, the exemplary device 10 includes an enclosure or housing 12, a display 14, user input structures 16, and input/output connectors or ports 18. The enclosure 12 may be formed from plastic, metal, composite materials, or other suitable materials, or any combination thereof. The enclosure 12 may protect the interior components of the electronic device 10 from physical damage, and may also shield the interior components from electromagnetic interference (EMI).

The display 14 may be a liquid crystal display (LCD), a light emitting diode (LED) based display, an organic light emitting diode (OLED) based display, or some other suitable display, which may, in at least some embodiments, be disposed in or integrated into the housing 12. In accordance with certain embodiments of the present invention, the display 14 may display a user interface and various other images 15, such as logos, avatars, photos, album art, and the like. Additionally, in one embodiment, the display 14 may also be a user input structure 16 and include a touch screen through which a user may interact with the user interface. The display may also include various function and/or system indicators to provide feedback to a user, such as power status, call status, memory status, or the like. These indicators may be incorporated into the user interface displayed on the display 14.

In one embodiment, one or more of the user input structures 16 are configured to control the device 10, such as by controlling a mode of operation, an output level, an output type, etc. For instance, the user input structures 16 may include a button to turn the device 10 on or off. Various embodiments of the portable electronic device 10 may include any number of user input structures 16, including buttons, switches, a control pad, a scroll wheel, or any other suitable input structures. The user input structures 16 may work with the user interface displayed on the device 10 to control functions of the device 10 and/or any interfaces or devices connected to or used by the device 10. For example, the user input structures 16 may allow a user to navigate a displayed user interface or to return such a displayed user interface to a default or home screen.

The exemplary device 10 may also include various input and output ports 18 to allow connection of additional devices. For example, a port 18 may be a headphone jack that provides for the connection of headphones. Additionally, a port 18 may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, AC and/or DC power connectors, and other wired or wireless connection ports. Further, the device 10 may use the input and output ports to connect to and send or receive data with any other device, such as other portable electronic devices, personal computers, printers, or the like. For example, in one embodiment, the device 10 may connect to a personal computer via an IEEE-1394 connection or USB connection to send and receive data files, such as media files.

Figure 2:
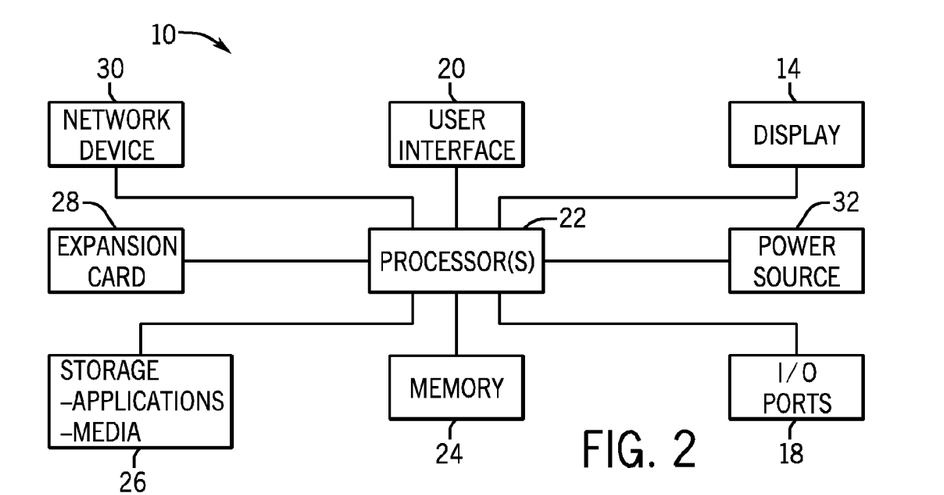
FIG. 2 is a simplified block diagram of the portable media player of FIG. 1 in accordance with one embodiment of the present invention.

Additional details of the illustrative device 10 may be better understood through reference to FIG. 2, which is a block diagram illustrating various components and features of the device 10 in accordance with one embodiment of the present invention. In the presently illustrated embodiment, the device 10 includes the display 14 and the I/O ports 18 discussed above. In addition, as discussed in greater detail below, the exemplary device 10 may include a user interface 20, one or more processors 22, a memory device 24, a non-volatile storage 26, card interface(s) 28, a networking device 30, and a power source 32.

As discussed further herein, the user interface 20 may be displayed on the display 14, and may provide a means for a user to interact with the electronic device 10. The user interface may be a textual user interface, a graphical user interface (GUI), or any combination thereof, and may include various layers, windows, screens, templates, elements, or other components that may be displayed in all or in part of the display 14. The user interface 20 may, in certain embodiments, allow a user to interface with displayed interface elements via one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 20.

The processor(s) 22 may provide the processing capability required to execute the operating system, programs, user interface 20, and any other functions of the device 10. Programs or instructions executed by the processor(s) 22 may be stored in any suitable manufacture that includes one or more tangible, computer-readable media (at least collectively storing the executed instructions), such as, but not limited to, the memory devices and storage devices described below, and may also include instructions that may be executed by the processor(s) 22 to enable the device 10 to provide the functionalities described herein. The processor(s) 22 may include one or more microprocessors, such as one or more "general-purpose" microprocessors, one or more special-purpose microprocessors and/or ASICS, or some combination thereof. For example, the processor(s) 22 may include one or more reduced instruction set (RISC) processors, such as a RISC processor manufactured by Samsung, as well as graphics processing units (GPUs), video processors, audio processors, and/or related chip sets.

As noted above, embodiments of the electronic device 10 may also include a memory 24. The memory 24 may include a volatile memory, such as random access memory (RAM), and/or a non-volatile memory, such as read-only memory (ROM). The memory 24 may store a variety of information and may be used for various purposes. For example, the memory 24 may store the firmware for the device 10, such as an operating system, and other programs that enable various functions of the device 10. The memory 24 may also be used for buffering or caching during operation of the device 10.

The non-volatile storage 26 of device 10 of the presently illustrated embodiment may include ROM, flash memory, a hard drive, or any other suitable optical, magnetic, or solid-state storage medium, or a combination thereof. The storage 26 may store data files such as media (e.g., music and video files), executable applications or instructions (e.g., software for implementing functions on device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable the device 10 to establish a wireless connection, such as a telephone connection), subscription information (e.g., information that maintains a record of podcasts, television shows, or other media to which a user subscribes), telephone information (e.g., telephone numbers), and any other suitable data.

The embodiment illustrated in FIG. 2 also includes one or more card interfaces or slots 28. The card slots may be configured to receive expansion cards that may be used to add functionality to the device 10, such as additional memory, I/O functionality, or networking capability. Such an expansion card may connect to the device through any type of suitable connector, and may be accessed internally or external to the enclosure 12. For example, in one embodiment, the card may be flash memory card, such as a SecureDigital (SD) card, mini- or microSD, CompactFlash card, Multimedia card (MMC), or the like. Additionally, in an embodiment including mobile telephone functionality, a card slot 28 may receive a Subscriber Identity Module (SIM) card.

The exemplary device 10 depicted in FIG. 2 also includes a network device 30, such as a network controller or a network interface card (NIC). In one embodiment, the network device 30 may be a wireless NIC providing wireless connectivity over any 802.11 standard or any other suitable wireless networking standard. The network device 30 may allow the device 10 to communicate over a network, such as a LAN, WAN, MAN, or the Internet. Further, the device 10 may connect to and send or receive data with any device on the network, such as portable electronic devices, personal computers, printers, and so forth. For example, in one embodiment, the device 10 may connect to a personal computer via the network device 30 to send and receive data files, such as media files. Alternatively, in some embodiments, the portable electronic device may not include a network device 30. In such an embodiment, a NIC may be added into card slot 28 to provide similar networking capability as described above.

Further, the device 10 may also include a power source 32. In one embodiment, the power source 32 may be one or more batteries, such as a Li-Ion battery, may be user-removable or secured to the housing 12, and may be rechargeable. Additionally, the power source 32 may include AC power, such as provided by an electrical outlet, and the device 10 may be connected to the power source 32 via the I/O ports 18.

Figure 3:
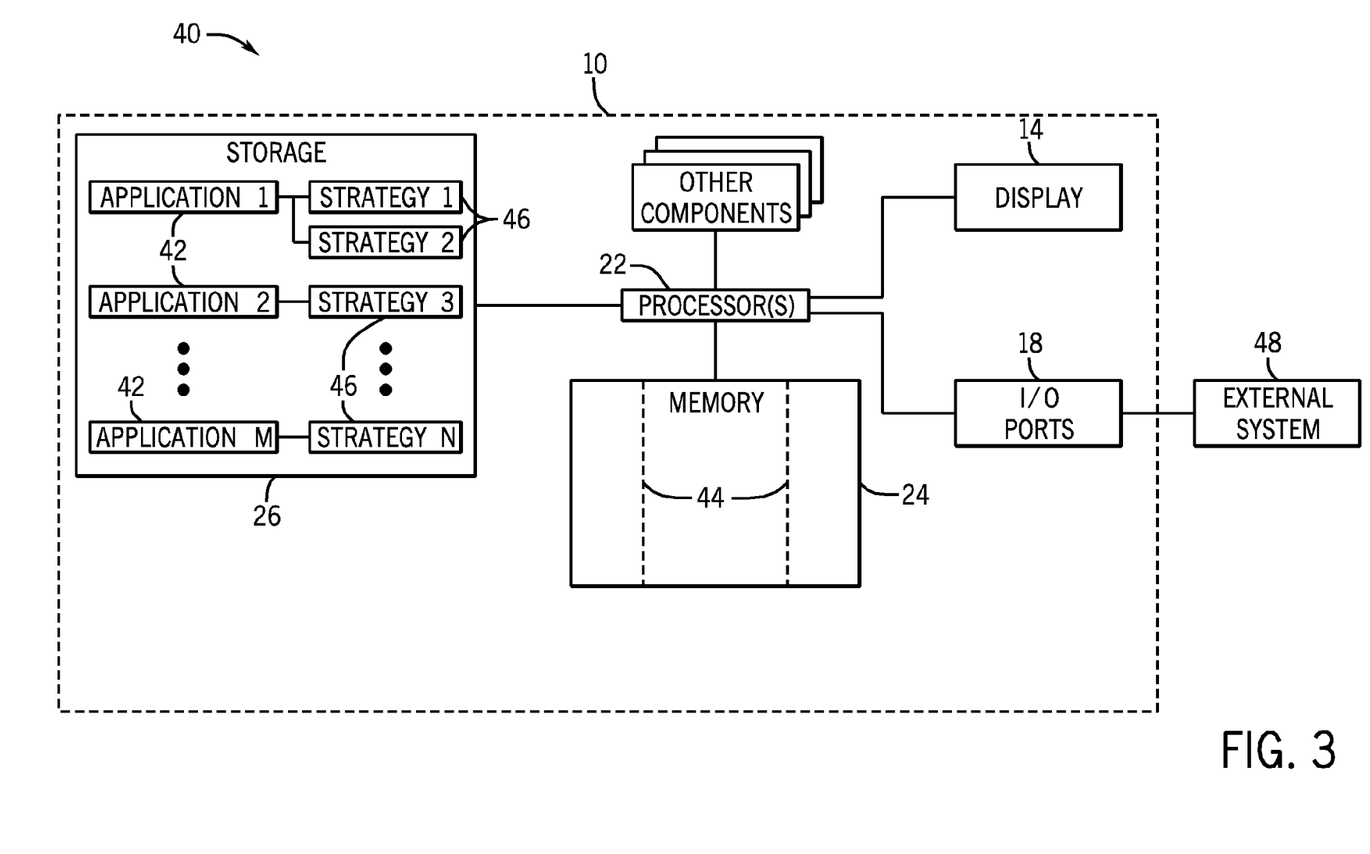
FIG. 3 is a block diagram illustrating certain additional aspects of the portable media player of FIGS. 1 and 2 in accordance with one embodiment of the present invention.

Certain additional aspects of an exemplary device 10 are depicted in the block diagram 40 of FIG. 3 in accordance with one embodiment of the present invention. For instance, in the presently illustrated embodiment, the storage 26 includes a plurality of executable applications or programs 42. As will be appreciated, such applications (or clients) 42 may be executed by the one or more processor(s) 22, and may be allocated memory space from the memory 24 to facilitate such execution. The processor(s) 22 may include a GPU and the memory 24 (or a portion thereof) may be graphics memory (i.e., generally dedicated to graphics applications or programs), although it is noted that other, non-graphical embodiments are also envisaged.

In one embodiment, the memory space of the memory 24 may be logically partitioned into multiple sections, as generally indicated by the dotted lines 44 and discussed in greater detail below. Memory space from these sections may be allocated to the applications 42, or various components thereof, according to one or more memory allocation strategies 46 associated with each application 42. Such memory allocation strategies 46 may generally represent preferences as to which portion of the memory 24 is allocated to an associated application 42 or application component. In some embodiments, the memory allocation strategies 46 are defined and stored in a memory or storage device prior to execution of the application by the device 10.

In some instances, multiple memory allocation strategies 46 may be associated with a single application 42. For example, in one embodiment, an application 42 may be configured to provide graphical outputs to both (either simultaneously or alternatively) the device display 14 and an external system 48 (via a wired or wireless connection port 18), such as a television, a computer monitor, or computer system. As may be appreciated, the graphical outputs provided to the display 14 and the external system 48 may differ from one another in format. For instance, the display 14 and an external television may have different display characteristics, including, but not limited to, different resolutions. In view of such differences, different graphical outputs may be provided by the application 42. For instance, in one embodiment, a graphical output may be provided to the external system 48 in a television resolution (e.g., 480i, 720p, 1080i, or 1080p) or video format (e.g., National Television System Committee (NTSC) format, Phase Alternating Line (PAL) format, Sequential Color with Memory (SECAM) format, or Advanced Television Systems Committee (ATSC) format), while another graphical output may be provided to the display 14 in a different resolution and/or format.

The processing and generation of these differing outputs by one or more applications 42 may need and/or benefit from different amounts of memory. In one embodiment, different memory allocation strategies 46 may allow different portions or amounts of memory space to be allocated to a single application 42 (or multiple applications 42) according to the format or type of output generated, allowing for memory to be allocated to the application in a flexible, use-specific manner.

In another embodiment, multiple memory allocation strategies 46 may be associated with different classes of graphical output to the display 14, such as different types of screens that may be rendered on the display 14 via one or more applications 42. Of course, applications 42 may be associated with a single memory allocation strategy 46, rather than multiple memory allocation strategies. Indeed, in some embodiments, other applications may not be associated with any memory allocation strategy 46. In such instances, the device may allocate memory to the application according to a default procedure.

Figure 4:
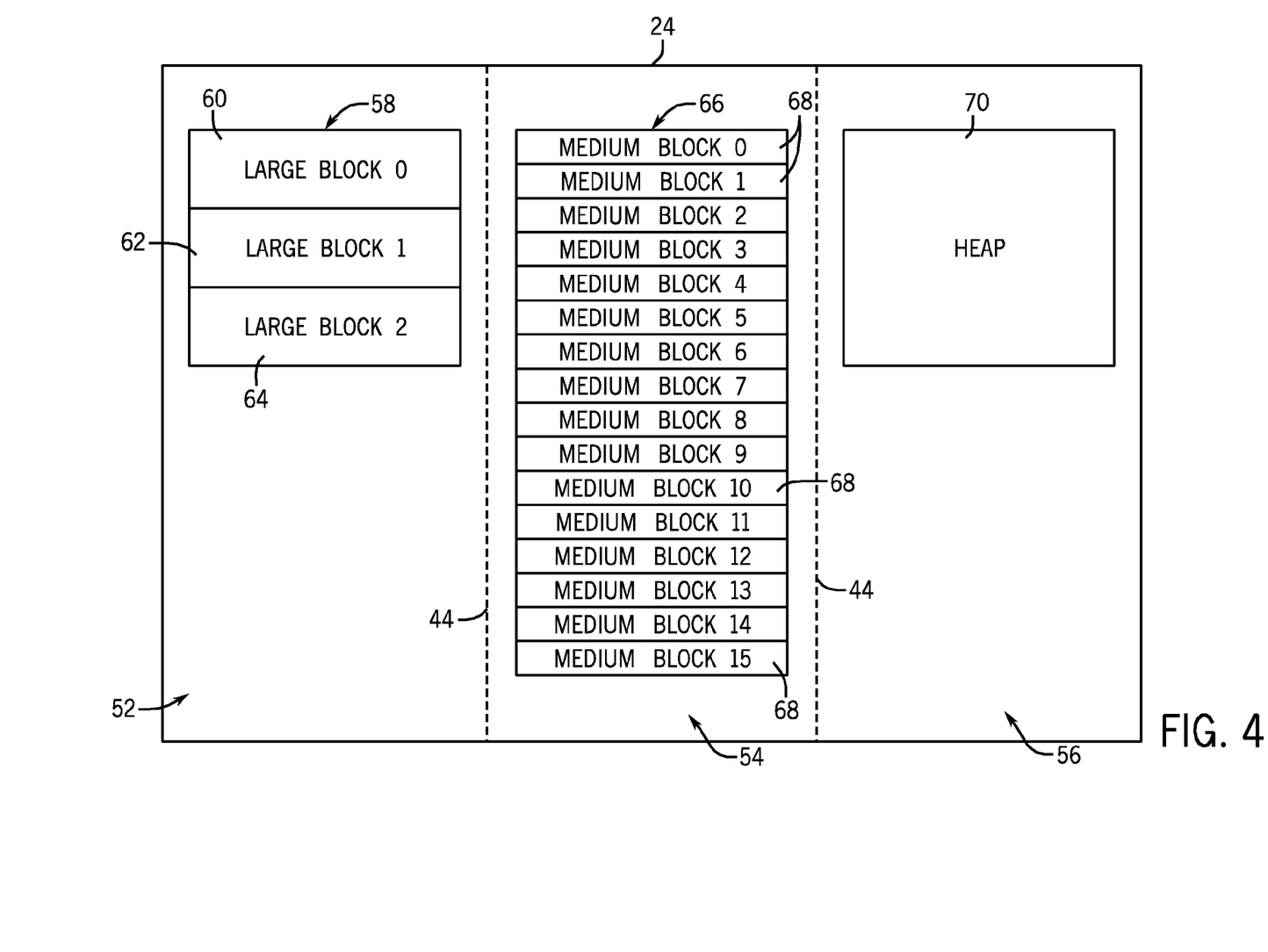
FIG. 4 depicts the logical partitioning of a memory space into various sections and blocks in accordance with one embodiment of the present invention.

The logical partitioning of the memory 24 is illustrated in FIG. 4 in accordance with one embodiment of the present invention. In the presently illustrated embodiment, the memory space of the memory 24 is logically divided into sections 52, 54, and 56. In some embodiments, the section 52 may include, or consist of, a set or group 58 of "large" contiguous blocks of memory, such as large blocks 60, 62, and 64. In turn, the section 54 may either include or consist of a set or group 66 of "medium" contiguous blocks 68 of memory. Additionally, the section 56 may include, or be consist of, a memory heap 70.

Each block of the sets 58 and 66 represents a continuous, fixed-size portion of memory space in the memory 24. It is noted that the terms "large block" and "medium block" are used herein for comparative purposes only, and are not intended to suggest blocks of any particular size. More specifically, as used herein, "medium block" refers merely to a fixed-size block of contiguous memory smaller than a "large block," which, in turn, is employed merely to denote a fixed-size block of contiguous memory larger than a "medium block." In one embodiment, the section 52 may include at least two large blocks that are each approximately 1.6 MB in size, the section 54 may include at least sixteen medium blocks that are approximately 512 KB in size, and the memory heap 70 may be approximately 3.6 MB or 4 MB in size. The large blocks of section 52 may be substantially equal in size, or may vary in size. For instance, in addition to the large 1.6 MB blocks, the group 58 of large blocks may also include one or more blocks that are approximately 1.2 MB in size. Likewise, the medium blocks 68 of group 66 may also be substantially identical in size, or may vary in size. The sections and blocks described above are provided for the sake of explanation. It will be appreciated, however, that the memory 24 may divided into different numbers and/or sizes of sections and blocks in full accordance with the present techniques.

Figure 5:
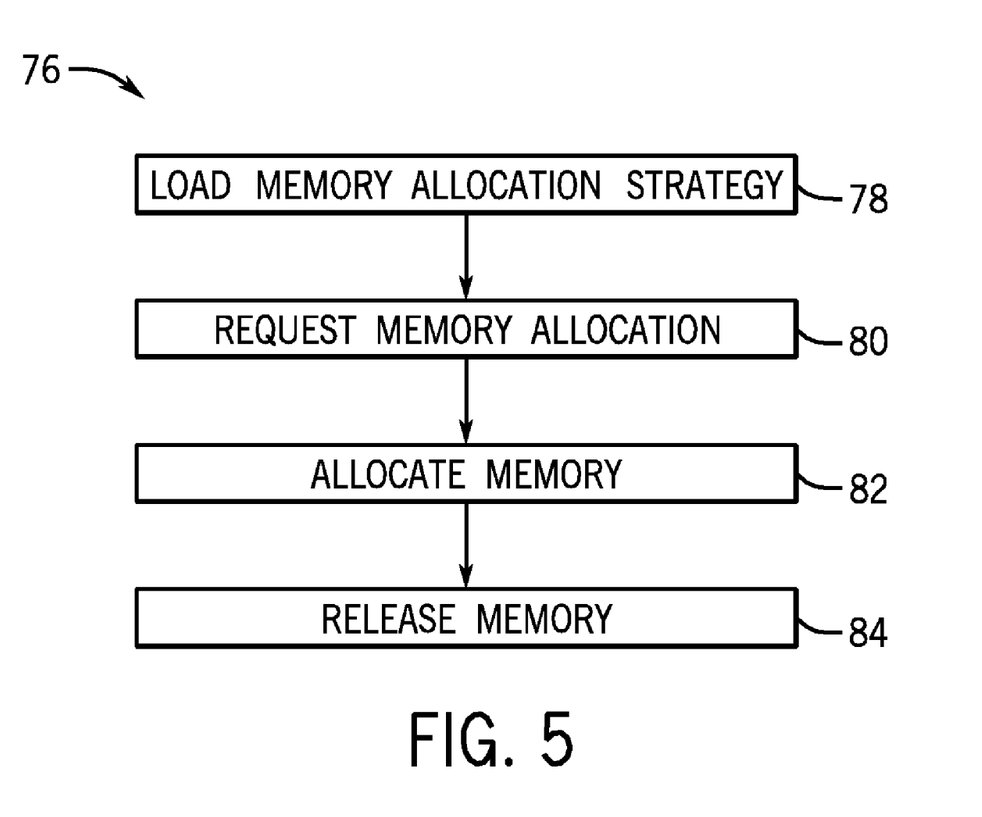
FIG. 5 is a flow chart of an exemplary process for allocating memory from the memory space of FIG. 4 in accordance with one embodiment of the present invention.

A flow chart for an exemplary process 76 of allocating memory to an application is illustrated in FIG. 5 in accordance with one embodiment. The process 76 includes a step 78 of loading a memory allocation strategy 46 for a given application 42 or component thereof. The memory allocation strategy 46 for an application 42 may be stored as a separate file in the storage 26 or some other storage or memory device. In other embodiments, the memory allocation strategy 46 may be included as part of a larger file, such as a screen template for an application 42 configured to generate one or more screens for viewing on the display 14 or some other display device. In some embodiments, the memory allocation strategy 46 file may include executable instructions to facilitate implementation of the strategy, or may include a "flag" (e.g., one or more data bits that may be set to represent a particular strategy) that is interpreted by some other hardware or software component.

The process 76 further includes, in a step 80, requesting memory space according to the memory allocation strategy 46 loaded in step 78. The device 10 may then allocate available memory from one or more of the memory blocks of sections 52 or 54, or from the memory heap 70 of section 56, as discussed in greater detail below with respect to FIGS. 6 and 7. Once the application or application component is finished with the allocated memory, such memory may be released for use by other applications in a step 84.

Figure 6:
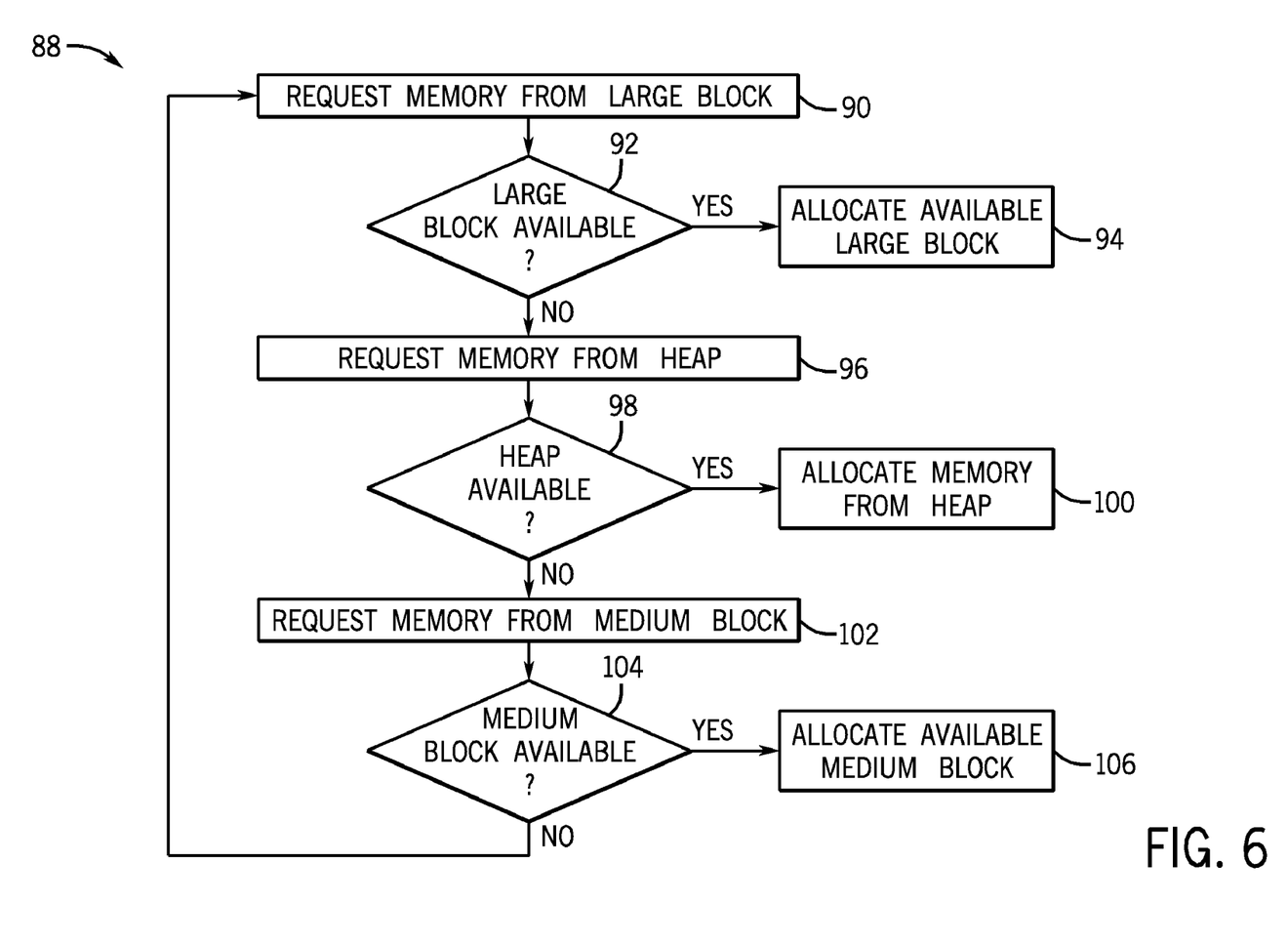
FIG. 6 is a flow chart of one embodiment of a process for allocating memory in accordance with a first exemplary memory allocation strategy.

A flow chart of an exemplary process 88 for requesting and allocating memory in accordance with one possible memory allocation strategy 46 is depicted in FIG. 6 in accordance with one embodiment of the present invention. In the presently illustrated embodiment, the memory allocation strategy 46 may indicate a preference to first request memory from a large block of section 52, to second request memory from the memory heap 70 if the first request cannot be met, and to third request memory from a medium block 68 if neither of the first two requests can be met.

Accordingly, the process 88 in such an embodiment includes a step 90 of requesting memory space from the set 58 of large blocks. If one or more large blocks are available (decision block 92), an available large block, such as large block 60, may be allocated to the requesting application or component, in a step 94. Otherwise, the process 88 may proceed with a request for memory from the memory heap 70 in a step 96. Likewise, if sufficient memory is available within the memory heap 70 (decision block 98), a portion of available memory from the heap 70 may be allocated to the application or application component in a step 100.

If the heap 70 does not contain sufficient available memory, however, the process 88 may continue to step 102, in which memory is requested from the set 66 of medium blocks. If one or more medium blocks are available (decision block 104), then an available medium block 68 may be allocated to the application or application component in a step 106. If no medium blocks are available, the process 88 may return to step 90 and repeat the steps noted above, continuing to request memory until the request is granted or until a threshold amount of time has passed. It is further noted that, if the large blocks vary in size and/or the medium blocks vary in size, the request may specify a block of a particular size, a range of acceptable sizes, a minimum and/or maximum block size, a range of blocks known to be of acceptable size, or the like. It will also be appreciated that, while a single request process is described above, an application may request memory allocations from more than one block. For instance, an application controlling background and foreground images (e.g., a background video with graphical overlays, such as controls or status indicators), or controlling a transition between two different screens displayed on the display 14, may request memory from multiple sources or blocks, such as from two large blocks, a large block and a medium block, from a medium block and the heap, and so forth.

Figure 7:
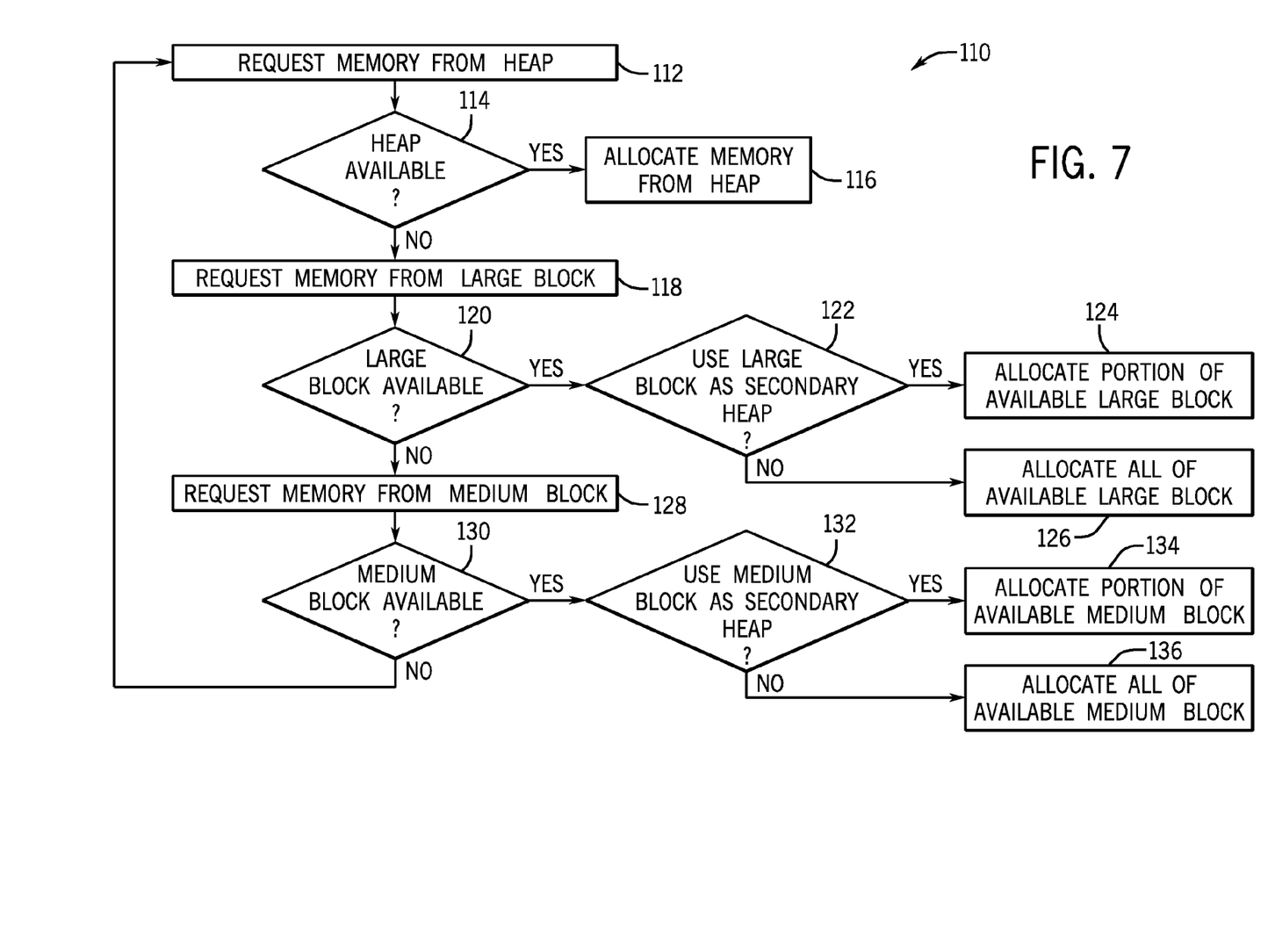
FIG. 7 is a flow chart of another embodiment of a process for allocating memory in accordance with a second exemplary memory allocation strategy.

In another embodiment, generally illustrated in FIG. 7, an exemplary process 110 for requesting and allocating memory may be employed in accordance with a different memory allocation strategy 46, in which memory is requested from, in order, the memory heap 70, a large block, or a medium block. The process 110 may include a step 112 of requesting memory space from the memory heap 70. If the heap 70 has sufficient memory available (decision block 114), the requested memory may be allocated, in a step 116, to the application or application component from the memory heap 70. If the memory heap 70 does not include sufficient available memory, the process 110 may continue, in step 118, by requesting memory from a large memory block of set 58. If a large block is available, the process 110 may also determine (decision block 122) whether to use the available large block as a secondary heap (by allocating only a portion of the available large block to the program, in a step 124, such that the remaining portion of the block may be allocated to other applications and requests), or whether to allocate the entire large block to the requesting application or component, in a step 126.

If a large block is not available for use by the requesting application or component, the process 110 may proceed to a step 128, in which memory is requested from a medium block 68 of the set 66. If a medium block is available (decision block 130), the medium block may be partially (step 134) or fully allocated (step 136) to the requesting program, depending on whether the medium block will be used as a secondary memory heap (decision block 132). As above with respect to process 88, if no medium blocks are available, the process 110 may return to its beginning (step 112) and continue to request memory until the request is granted or until a threshold amount of time has passed.

It should be noted that various other memory allocation strategies 46, including various memory allocation permutations (e.g., large block-medium block-heap, heap-large block-medium block, and so forth), may be used by the device 10 in full accordance with the present techniques. Further, different memory allocation strategies 46 may be used for different applications, or clients, based on the relative memory size requirements of the applications and/or the memory size requirements of other applications that may run concurrently. For instance, it may be preferred to allocate memory to memory-intensive clients (such as certain games, full-size television outputs, slide shows, or the like) from the large contiguous blocks of memory, and to allocate memory to less memory-intensive clients from the medium blocks (e.g., for full screen displays on display 14 that are less than full-size television outputs) or from the heap (e.g., for thumbnail images on the display 14). Additionally, in one embodiment, a device 10 may include a media player adapted to reproduce graphics or video on the display 14 and to also output a video or graphical signal to an external television. In such an embodiment, large blocks of memory may be allocated as video buffers to facilitate output of a video signal to the external television (such as two large blocks 1.6 MB in size for an NTSC format) in accordance with a first allocation strategy 46, while medium blocks (e.g., 512 KB blocks) may be allocated to facilitate graphics or video rendering on the display 14 in accordance with a second strategy 46.

In another embodiment, a first application configured to provide an output video signal to an external device may include a memory allocation strategy 46 indicating preferences to request memory first from the large blocks, then from the heap, and then from the medium blocks, while a second application configured to display images on the display 14 may include a memory allocation strategy 46 for requesting memory first from the medium blocks, then from the heap, and then from the large blocks. Still further, other applications or code may request memory first from the memory heap, then from the large blocks, and then from the medium blocks, in accordance with associated memory allocation strategies 46. Further, a default allocation strategy (which may be any desired permutation of preferred order, such as large block-medium block-heap) may be used to allocate memory to other applications with no other pre-defined strategy.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device comprising:
    a housing;
    a storage device disposed in the housing, the storage device including a plurality of executable applications stored therein and each executable application of the plurality of executable applications are assigned an allocation strategy from a plurality of different allocation strategies;
    a memory device disposed in the housing, wherein the memory space of the memory device is logically partitioned into at least a first group of one or more contiguous memory blocks, a second group of one or more contiguous memory blocks each smaller than the one or more memory blocks of the first group, and a memory heap containing memory blocks of varying sizes; and
    a processor disposed in the housing and configured to execute the plurality of applications stored in the storage device;
    wherein the device is configured to allocate memory, from at least one of a memory block of the first group, a memory block of the second group, or the memory heap, to at least one application of the plurality of executable applications upon execution of the at least one application by the processor, wherein the memory allocation is based on an allocation strategy assigned to the at least one application from the plurality of different allocation strategies, and the allocation strategy defines a prioritized order for the first group, the second group, and the memory heap.

2. The device of claim 1, comprising a display disposed in the housing.

3. The device of claim 2, comprising a connection port configured to facilitate communication of a graphical output from the device to an additional, external device.

4. The device of claim 3, wherein the connection port is configured to facilitate communication of the graphical output in a television video format.

5. The device of claim 4, wherein the television video format includes a National Television System Committee format, a Phase Alternating Line format, a Sequential Color with Memory format, or an Advanced Television Systems Committee format.

6. The device of claim 3, wherein the at least one application is configured to provide a first graphical output to the display, a second graphical output to the additional, external device via the connection port, or both the first and second graphical outputs, and wherein the first and second graphical outputs have different formats.

7. The device of claim 3, wherein the connection port includes a wired connection port or a wireless connection port.

8. The device of claim 1, wherein the storage device comprises at least one of a hard drive, flash memory, an expansion card, or read-only memory.

9. The device of claim 1, wherein the memory device comprises random access memory.

10. The device of claim 1, wherein the device comprises a portable media player.

11. A method comprising:
loading a memory allocation strategy of an application executed by a processor of a device, the device including a memory space logically organized into at least a first set of contiguous memory blocks, a second set of contiguous memory blocks, and a memory heap containing memory blocks of varying sizes, wherein the memory allocation strategy defines a prioritized order for the first set, the second set, and the memory heap and is stored in memory of the device prior to execution of the application, and additional applications are assigned an allocation strategy from a plurality of different allocation strategies including the memory allocation strategy;
requesting a portion of the memory space for the application according to the memory allocation strategy; and
allocating memory space to the application from at least one contiguous memory block of the first or second sets, or from the memory heap, in response to the request.

12. The method of claim 11, wherein the memory allocation strategy defines a first preference for requesting memory space from one of the first set, the second set, or the memory heap.

13. The method of claim 12, wherein the memory allocation strategy further defines at least one additional preference for requesting memory space from another of the first set, the second set, or the memory heap if memory space cannot be allocated according to the first preference.

14. The method of claim 12, wherein the application is configured to provide a graphical output to an integrated display of the device.

15. The method of claim 14, wherein each of the memory blocks of the first set are larger than each of the memory blocks of the second set, and wherein requesting the portion of the memory space includes requesting memory space from the first set of memory blocks.

16. The method of claim 15, wherein allocating memory space includes allocating at least one available memory block of the first set to the application.

17. The method of claim 15, wherein allocating memory space includes allocating available memory space from the second set of memory blocks or from the memory heap if no memory blocks in the first set are available.

18. The method of claim 17, wherein allocating available memory space from the second set of memory blocks or from the memory heap is performed in accordance with the memory allocation strategy.

19. The method of claim 14, wherein the application is configured to provide an additional graphical output to a remote device.

20. The method of claim 19, wherein loading the memory allocation strategy includes loading at least one of a first memory allocation strategy associated with providing the graphical output to the integrated display or a different, second memory allocation strategy associated with providing the additional graphical output to the remote device.

21. The method of claim 11, comprising releasing the allocated memory space when no longer needed by the application.

22. The method of claim 11, wherein the application is associated with a plurality of memory allocation strategies.

23. The method of claim 11, wherein allocating memory space to the application comprises allocating only a portion of the at least one contiguous memory block of the first or second sets to the application such that the remainder of the at least one contiguous memory block may be operated as a secondary memory heap.

24. A manufacture comprising:
one or more tangible, computer-readable media having application instructions encoded thereon, the application instructions comprising:
instructions for determining a memory allocation strategy associated with a graphics program from a plurality of different memory allocation strategies; and
instructions for allocating graphics memory space from one of at least three different logical groups within the graphics memory space, the three different logical groups including a heap memory containing memory blocks of varying sizes, a first block of contiguous memory, and a second block of contiguous memory larger than the first block, wherein the memory allocation strategy defines a prioritized order for the heap memory, the first block, and the second block.

25. The manufacture of claim 24, wherein the one or more tangible, computer-readable media include at least one of flash memory, read-only memory, random access memory, or a hard drive.

26. The manufacture of claim 24, wherein the one or more tangible, computer-readable media include the graphics program encoded thereon.

27. A device comprising:
a housing;
a display disposed in the housing;
a storage device disposed in the housing, the storage device including a plurality of executable applications stored therein and each executable application of the plurality of executable applications are assigned an allocation strategy from a plurality of different allocation strategies, the plurality of executable applications including graphical applications configured to provide graphical outputs in a first format to the display disposed in the housing and in a second format, different from the first format, to an additional display external to the housing;
a processor disposed in the housing and configured to execute the plurality of applications stored in the storage device; and a memory device disposed in the housing, wherein the memory space of the memory device is logically partitioned into at least a first plurality of memory blocks, a second plurality of memory blocks, and a memory heap containing memory blocks of varying sizes;

wherein the device is configured to allocate memory from the first plurality of memory blocks, if available, to a first graphical application configured to provide graphical outputs in the first format to the display disposed within the housing, and to allocate memory from the second plurality of memory blocks, if available, to a second graphical application configured to provide graphical outputs in the second format to the additional display external to the housing, wherein the allocation strategy defines a prioritized order for the first plurality of memory blocks, the second plurality of memory blocks, and the memory heap.

28. The device of claim 27, wherein the first format and the second format have different output resolutions.

* * * * *